June 7, 1949.  A. B. REED  2,472,619
PICTURE SELECTOR
Filed Oct. 25, 1945
FIG. 1.
FIG. 2.
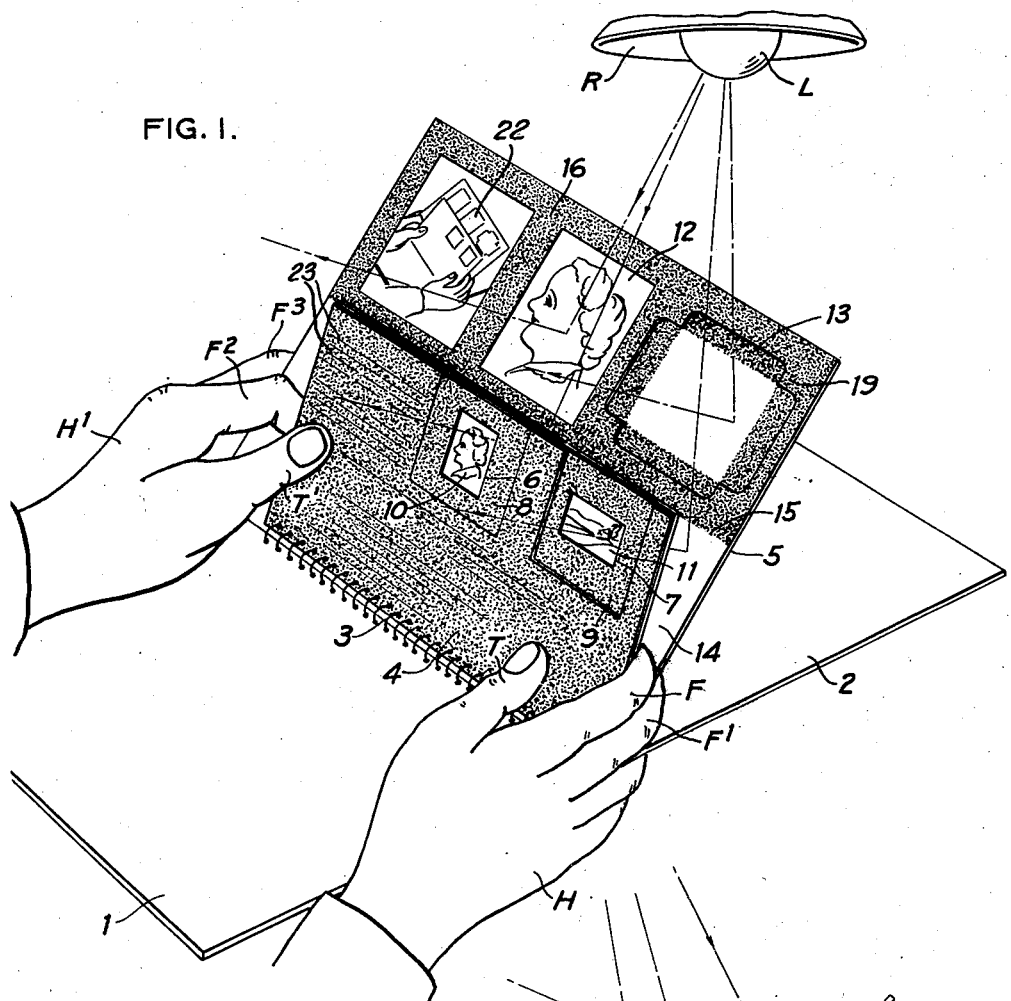
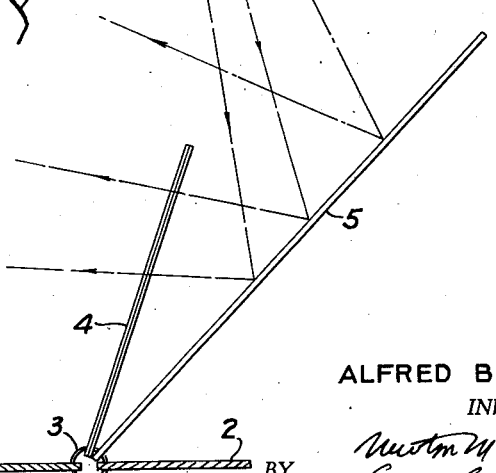
ALFRED B. REED
INVENTOR
BY
ATTORNEYS Patented June 7, 1949

2,472,619

UNITED STATES PATENT OFFICE 2,472,619

PICTURE SELECTOR

Alfred B. Reed, Rochester, N. Y., assignor to Eastman Kodak Company, Rochester, N. Y., a corporation of New Jersey Application October 25, 1945, Serial No. 624,568

6 Claims. (Cl. 35—50)

This invention relates to photography and more particularly to a guide for selecting suitable pictures for reproduction. One object of my invention is to provide a device which is particularly adapted for use with color transparencies by which a prospective customer may determine about what he may expect to get in the way of a print or enlargement from a given transparency. Another object of my invention is to provide a device in which prints may be compared with original transparencies. Another object is to provide a device for establishing a balanced lighting of reflected and transmitted light for viewing color pictures in both transparent and opaque supports. Other objects will appear from the following specification, the novel features being particularly pointed out in the claims at the end thereof.

It is usually very difficult for even one skilled in the art to determine whether or not a satisfactory reproduction can be made from an original and this is particularly true where the original is in color. Since transparencies are normally viewed by transmitted light, they naturally have a much greater brilliance than the same picture carried by an opaque base, because the amount of light which can pass through a transparency is many times greater than the amount of light which can be reflected from an opaque picture. Accordingly, it is often difficult to determine whether or not a transparency is of the proper quality to produce a satisfactory reproduction. I have provided a means which will enable anyone to estimate what can be expected from a reproduction when a transparency, either in black and white or in color, is used by combining reflected and transmitted light in such a manner that a relatively true visual estimate can be made. By providing a standard transparency, a standard reproduction therefrom, and adjusting lighting conditions until they appear substantially the same, excellent results can be obtained, and it will be a comparatively simple matter to determine whether or not prints or enlargements should be ordered from a given transparency.

Coming now to the drawings wherein like reference characters denote like parts throughout:

Fig. 1 is a perspective view of my picture selector constructed in accordance with and embodying a preferred form of my invention; and Fig. 2 is a fragmentary detailed section through the selector shown in Fig. 1.

My invention comprises broadly a selector in which a standard transparency and a standard reproduction thereof are permanently mounted. A picture frame for a transparency to be judged may be carried adjacent the standard transparency and a seat or recess may be provided for a reproduction to be judged under light conditions similar to those used in viewing the standard transparency and reproduction. I also provide a means for combining reflected and transmitted light in such a manner that by properly adjusting the transmitted and reflected light until the standard transparency and the standard reproduction thereof look substantially the same, a transparency to be judged will also appear in the proper relative contrast and general appearance to indicate what might be expected in a reproduction made therefrom.

More specifically, in the preferred embodiment of my invention shown in Fig. 1, I prefer to provide a selector in the general form of a loose-leaf album having a front board 1 and a back board 2 connected by means of a spiral wire connecting member 3 which also serves as a hinge. I provide two leaves also mounted on the spring 3; a front leaf 4 and a rear leaf 5. The front leaf 4 is provided with a pair of frames 6 and 7 which are adapted to receive a standard form of transparency mount which may be arranged vertically as at 8, or horizontally as at 9. The frame 6 is preferably used to receive a standard transparency 10 which may be in the form of a color slide. The frame 7 is adapted to receive a transparency 11 which is to be judged by viewing under lighting conditions under which the standard transparency 10 and the standard reproduction therefrom 12 appear substantially the same in general appearance, color, brilliance, contrast, etc. The leaf 4 may be of a neutral gray or other color matching the mounts 8 and 9. White is preferably not used. Leaf 4 is considerably smaller than leaf 5, as shown, so that the upper part of leaf 5 is always exposed for viewing.

The rear leaf 5 is provided with a picture 12 which, in this case, may be a color print from the color transparency 10. The leaf 5 is also provided with a frame 13 which may be used to receive a print from the transparency 11 although this part of the leaf 5 is not essential. If desired, the leaf 5 may also carry a picture, or diagram, 22, showing how to hold the comparator, and printed directions for use may appear at 23 on the leaf 4. These may be omitted if desired. It will be noticed that the leaf 5 is provided with a light-reflecting surface 14 which extends from the hinge member 3 up to a line 15 which is substantially as long as the height of the front leaf 4. This light-reflecting surface may be a plain white paper, or some other light-reflecting medium and preferably one which will more or less diffuse light. Above the line 15 with reference to Fig. 1, the leaf 5 is provided with a neutral gray surface 16 which forms a suitable background for the pictures to be viewed and which does not detract from the highlights or shadows of the picture.

It is, of course, possible to move the front leaf 4 and the rear leaf 5 about the hinge 3 and, accordingly, these two leaves may be adjusted so that light from a suitable source such as the lamp L and the reflector R may be caused to strike the picture 12 which is directly illuminated and which is the standard of comparison print and also to reflect light through the transparency 10 which is the standard of comparison transparency. By altering the position of the two leaves relative to the light L, reflected and transmitted light can be combined until the brilliancy, contrast, and color of the reproduction 12 is substantially that of the transparency 10. The general appearance and brilliancy will appear similar when the reproduction 12 is illuminated by quite a large amount of direct light, while the transparency 10 may be illuminated by a comparatively small quantity of reflected light, this light being reflected by the surface 14. The transparency 10 may be illuminated by some reflected light and some transmitted light according to the position of the leaf 4. Thus, the direct light from the lamp L falling on the reproduction 12 is reflected by the reproduction to the eye of an observer while light from the lamp L is reflected by the white surface 14 through the transparencies 10 and 11 to the eye of an observer. When the reproduction 12 appears to be extremely similar in color values, contrast, and general brilliancy to the transparency 10, it is obvious that by looking at the transparency 11, one can determine that a reproduction from such a transparency will appear to resemble the transparency. If the book is not moved during this comparison, and if the transparency being compared appears too dark, or too colorless, or too light, then it will be apparent that the resulting reproduction will be the same. On the other hand, if the transparency 11, when thus illuminated, gives a pleasing appearance, the same appearance can be reproduced in a print or enlargement of the transparency.

If a reproduction has been ordered and is received, and if it appears to the customer that the reproduction is not satisfactory, by placing the reproduction in the frame 13 it can readily be checked as follows: Leaves 4 and 5 are again adjusted relative to a source of light L until the standard transparency 10 and the standard reproduction 12 look similar. Then, by comparing a reproduction with its transparency 11 if they look similar, the reproduction is the best that can be expected. If it is too dark or light, or of materially different appearance, then a better reproduction could be made.

This device forms a simple means which can be used in photographic stores for giving their customers an excellent idea of just how good a print or reproduction can be expected from any given transparency. While it is primarily designed for use with color transparencies, since these are by far the most difficult type of transparency to judge, it can, of course, be used in judging a black-and-white transparency to determine, in a general way, the quality of a reproduction therefrom.

With a selector, arranged as above described, the comparisons can be easily made. It is convenient to hold the leaves 4 and 5 for comparison by positioning the fingers F and $F^1$ of the right hand H, as indicated in Fig. 1, with the thumb T on one side of the leaf 4, the finger F between the leaves 4 and 5 and the finger $F^1$ behind the leaf 5 and above the back 2. The fingers $F^2$ and $F^3$ and the thumb $T^1$ of the left hand $H^1$ may be held in a similar manner since this is particularly convenient in retaining the leaves in their proper relationship while the customer may decide with reasonable assurance that the transparency 11 is suitable for making a satisfactory print.

It should also be noted that the frame 13, into which a print may be placed for comparison, is preferably provided in the shape of a cross as shown to take care of either vertical or horizontal prints. However, the background 19 is of the same color as the background 16—preferably a neutral gray—so that whichever type of print is placed in the receptacle 13—either vertical or horizontal—there will be no white light-reflecting surface showing to confuse the viewer. Instead of leaving a white square within the background 19, since this frame is not always used, the entire inside of frame 19 may be made neutral gray or other suitable color.

When the device is not in use, the leaves 4 and 5 may fold between the covers 1 and 2 as they turn about the hinge member 3. Thus, the selector is arranged to fold flat and yet it can be readily opeend up and quickly adjusted to permit a customer to determine for himself whether or not a reproduction is desirable from any given transparency.

The light source L is shown as being an incandescent lamp. Daylight may, of course, be used, or any other source of illumination. Artificial light is generally preferable because it is relatively constant. One important feature of my invention is that since lighting conditions are adjusted by balancing reflected and transmitted light each time the selector is used, any light source may be used.

I have described a preferred embodiment of my invention and it is obvious that various changes may be made without departing from the scope of my invention as defined in the following claims.

I claim:

1. A photographic selector comprising a pair of relatively movable leaves, a first leaf including picture-carrying frames and a second leaf carrying a reflecting surface and a picture mount, one of the picture-carrying frames of the first leaf being adapted to support a standard light-transmitting picture, the second leaf being adapted to support a standard opaque picture reproduced therefrom, the other picture frame of the first leaf being adapted to support a light-transmitting picture to be judged, movement of the first leaf relative to the other leaf varying transmitted light and reflected light from a suitable light source and falling upon the pictures to form a standard viewing lighting when the standard reproduction opaque picture and the standard light-transmitting picture are similar in contrast and brilliance at which time said light-transmitting picture to be judged will appear in the contrast and brilliance which may be expected from an opaque picture to be reproduced therefrom.

2. A photographic selector as defined in claim 1 characterized by a non-reflecting background of suitable color on the second leaf surrounding the opaque picture mounted thereon.

3. A photographic selector as defined in claim 1 characterized by a neutral gray background on the second leaf surrounding the opaque picture mounted thereon, said neutral gray area extending generally across the top of the leaf and leaving a white light-reflecting surface across the bottom of the sheet.

4. A photographic selector as defined in claim 1, characterized by the front leaf being much shorter than the second leaf, whereby said opaque picture reproduced from said light-transmitting picture to form standards of comparison may be supported on the second sheet in a readily visible position above the short front leaf.

5. A photographic selector as defined in claim 1, characterized by the front leaf being much shorter than the second leaf, whereby said opaque picture reproduced from said light-transmitting picture to be judged for comparison may be supported on the second sheet above the short front leaf, said light-reflecting surface carried by the second leaf being of substantially the same size as the first leaf.

6. A photographic selector comprising a hinged support, leaves attached to said hinged, adjacent picture-carrying frames arranged on the first leaf and movable therewith about the hinge, a light-reflecting surface on the second leaf, said second leaf being movable about said hinge independently of the first leaf whereby both leaves may be moved to vary their respective relationships to a suitable source of light and to vary reflected and transmitted light therefrom, a picture-carrying element on the second leaf adapted to carry a standard opaque picture, one of said picture-carrying frames on the first leaf being adapted to support a standard light-trnsmitting picture from which the standard opaque picture has been reproduced, the other of said picture frames being adapted to carry a light-transmitting picture to be judged whereby by moving the leaves relative to a light source until the general appearance of the standard light-transmitting picture and the opaque picture reproduced therefrom appear the same, the transmitted and reflected light on the adjacent light-transmitting picture to be compared will give the appearance to be expected of a reproduction therefrom.

ALFRED B. REED.

REFERENCES CITED

The following references are of record in the file of this patent:

UNITED STATES PATENTS

| Number | Name | Date |
| --- | --- | --- |
| 1,471,615 | Leffingwell | Oct. 23, 1923 |
| 2,101,122 | Woodside | Dec. 7, 1937 |
| 2,133,544 | Kolb | Oct. 18, 1938 |
| 2,284,031 | Arnold | May 26, 1942 |
| 2,302,556 | Kriebel | Nov. 17, 1942 |